(12) United States Patent
Huber et al.

(10) Patent No.: US 11,236,687 B2
(45) Date of Patent: Feb. 1, 2022

(54) INTERNAL COMBUSTION ENGINE FOR A MOTOR VEHICLE, AND METHOD FOR OPERATING SUCH AN INTERNAL COMBUSTION ENGINE

(71) Applicant: Daimler AG, Stuttgart (DE)

(72) Inventors: Franz Huber, Kirchheim (DE); Christian Lorenz, Fellbach (DE); Jochen Hufendiek, Stuttgart (DE); Johannes Ernst, Baden-Baden (DE)

(73) Assignee: Daimler AG, Stuttgart (DE)

( * ) Notice: Subject to any disclaimer, the term of this patent is extended or adjusted under 35 U.S.C. 154(b) by 1 day.

(21) Appl. No.: 16/765,821

(22) PCT Filed: Nov. 16, 2018

(86) PCT No.: PCT/EP2018/081587
§ 371 (c)(1),
(2) Date: May 20, 2020

(87) PCT Pub. No.: WO2019/101649
PCT Pub. Date: May 31, 2019

(65) Prior Publication Data
US 2020/0386172 A1   Dec. 10, 2020

(30) Foreign Application Priority Data

Nov. 21, 2017 (DE) .................... 10 2017 010 758.0

(51) Int. Cl.
*F02D 41/00* (2006.01)
*F02D 41/06* (2006.01)
(Continued)

(52) U.S. Cl.
CPC ............ *F02D 41/0002* (2013.01); *F01L 1/34* (2013.01); *F01L 9/18* (2021.01); *F02D 41/062* (2013.01);
(Continued)

(58) Field of Classification Search
CPC .............. F02D 41/0002; F02D 41/062; F02D 13/0207; F02D 2013/0292; F02D 2041/001; F01L 9/18; F01L 1/34
(Continued)

(56) References Cited

U.S. PATENT DOCUMENTS

| 4,798,184 | A | * | 1/1989 | Palko | ........................ F02B 3/06 123/316 |
| 5,596,957 | A | * | 1/1997 | Ichinose | ............. F02D 41/0002 123/179.18 |

(Continued)

FOREIGN PATENT DOCUMENTS

| DE | 10 2004 005 588 A1 | 8/2005 |
| DE | 10 2011 078 913 A1 | 1/2013 |
| DE | 10 2014 018 545 A1 | 6/2015 |

OTHER PUBLICATIONS

PCT/EP2018/081587, International Search Report dated Feb. 19, 2019 (Two (2) pages).

*Primary Examiner* — Thai Ba Trieu
(74) *Attorney, Agent, or Firm* — Crowell & Moring LLP

(57) ABSTRACT

An internal combustion engine for a motor vehicle includes a combustion chamber with a gas exchange valve which is movable between an open position and a first closed position. The gas exchange valve is movable on its path from the open position in a direction of the first closed position into an intermediate position located between the open position and the first closed position and is holdable in the intermediate position at least during a part of a compression cycle of the combustion chamber following the open position of the gas exchange valve and is movable into a second closed position following the intermediate position. The part comprises more than a half of the compression cycle and less (Continued)

than a whole of the compression cycle. The gas exchange valve is an inlet valve via which the combustion chamber is supplyable at least with air.

9 Claims, 2 Drawing Sheets

(51) Int. Cl.
  *F01L 9/18* (2021.01)
  *F01L 1/34* (2006.01)
  *F02D 13/02* (2006.01)
(52) U.S. Cl.
  CPC ...... *F02D 13/0207* (2013.01); *F02D 13/0269* (2013.01); *F02D 2013/0292* (2013.01); *F02D 2041/001* (2013.01)
(58) Field of Classification Search
  USPC .................................. 123/90.15, 345–348
  See application file for complete search history.

(56) References Cited

U.S. PATENT DOCUMENTS

| | | | | |
|---|---|---|---|---|
| 6,681,741 B2* | 1/2004 | Majima | ............... | F01L 1/34 123/90.15 |
| 6,928,969 B2* | 8/2005 | Bloms | ............... | F01L 13/06 123/90.15 |
| 7,669,559 B2* | 3/2010 | Aoyama | ............. | F02D 13/0269 123/48 B |
| 7,690,336 B2* | 4/2010 | Bowman | ............. | F02D 13/0269 123/90.15 |
| 8,186,330 B2* | 5/2012 | Kobayashi | .......... | F02D 13/0269 123/90.15 |
| 8,316,809 B1* | 11/2012 | Patterson | ............ | F02D 13/0211 123/90.16 |
| 8,375,904 B2* | 2/2013 | Gustafson | ........... | F02D 13/0226 123/90.15 |
| 8,448,616 B2* | 5/2013 | Kirk | ................... | F02D 13/0257 123/90.15 |
| 8,776,743 B2* | 7/2014 | Nakamura | .......... | F02D 13/0211 123/90.17 |
| 2002/0026913 A1* | 3/2002 | Ariga | ................ | F02D 13/0269 123/90.15 |
| 2004/0244742 A1 | 12/2004 | Chang | | |
| 2005/0229901 A1 | 10/2005 | Weber et al. | | |
| 2008/0035111 A1 | 2/2008 | Schmid et al. | | |
| 2009/0031999 A1* | 2/2009 | Erickson | ............. | F02B 29/0443 123/563 |
| 2012/0125276 A1* | 5/2012 | Baldwin | ............ | F02D 13/0269 123/90.17 |
| 2013/0146037 A1* | 6/2013 | Han | .................... | F02D 13/0261 123/565 |
| 2014/0026873 A1* | 1/2014 | Gehrke | ................ | F02D 41/005 123/568.11 |
| 2014/0032080 A1* | 1/2014 | Gehrke | ............... | F02D 41/0002 701/104 |
| 2014/0032082 A1* | 1/2014 | Gehrke | ............... | F02D 13/0269 701/104 |
| 2017/0037787 A1* | 2/2017 | Watanabe | ............ | F01L 1/3442 |

* cited by examiner

INTERNAL COMBUSTION ENGINE FOR A MOTOR VEHICLE, AND METHOD FOR OPERATING SUCH AN INTERNAL COMBUSTION ENGINE

BACKGROUND AND SUMMARY OF THE INVENTION

The invention relates to an internal combustion engine for a motor vehicle and a method for operating such an internal combustion engine.

Such an internal combustion engine for a motor vehicle and a method for operating such an internal combustion engine are already known, for example, from DE 10 2011 078 913 A1. The internal combustion engine has at least one combustion chamber filled with air and fuel for operating the internal combustion engine. Furthermore, the internal combustion engine comprises at least one gas exchange valve assigned to the combustion chamber, which can be moved, in particular translationally, between an open position and a first closed position. Within the scope of the method, the gas exchange valve is moved from its open position in the direction of its closed position.

The object of the present invention is to further develop an internal combustion engine and method of the type mentioned above in such a way that a particularly advantageous operation can be implemented.

In order to further develop an internal combustion engine of the type specified herein in such a way that a particularly advantageous operation of the internal combustion engine and thus of the motor vehicle as a whole can be implemented, it is provided in accordance with the invention that in at least one operating state of the internal combustion engine, the gas exchange valve can be moved or is moved on its path from the open position in the direction of the first closed position into an intermediate position located or arranged between the open position and the first closed position and can be or is held in the intermediate position at least during part of a compression cycle of the combustion chamber following the open position of the gas exchange valve, and the gas exchange valve can be moved into a second closed position subsequent to the intermediate position. The feature that the compression cycle follows the open position of the gas exchange valve is to be understood in particular that the compression cycle, during which the gas exchange valve is at least temporarily held in the intermediate position, immediately or directly follows the open position from which the gas exchange valve is moved in the direction of the first closed position and thereby into the intermediate position and is held in the intermediate position. This means that, between the compression cycle and the open position, which is immediately or directly followed by the compression cycle, there is no other or further compression cycle or other or further cycle of the combustion chamber.

The gas exchange valve is moved or operated in the at least one operating state according to a first valve lift curve, which describes the movement of the gas exchange valve from the open position in the direction of the first closed position and thereby into the intermediate position, as well as the holding of the gas exchange valve in the intermediate position, in particular depending on the time and/or depending on rotational positions of an output shaft of the internal combustion engine, which is designed, for example, as a crankshaft and can provide torques for driving the motor vehicle, for example, via the output shaft. The rotational positions are usually referred to as degree crank angles, in particular when the output shaft is designed as a crankshaft. By moving the gas exchange valve in the at least one operating state from the open position in the direction of the first closed position and thereby into the intermediate position and holding it in the intermediate position, wherein the gas exchange valve is held in the intermediate position, for example, starting from a first of the rotational positions of the output shaft and during several rotational positions of the output shaft following the first rotational position, such that the output shaft continues to rotate starting from the first rotational position, while the gas exchange valve is, however, held in the intermediate position, the first valve lift curve of the gas exchange valve has a plateau which extends, for example, from the first rotational position over the multiple rotational positions and thereby, for example, up to a second of the rotational positions, from which, for example, the gas exchange valve leaves the intermediate position, in particular in the direction of the second closed position. By way of example, the second rotary position is one of the several rotary positions, wherein several rotary positions of the output shaft preferably lie between the first rotary position and the second rotary position.

It has been found that, by means of the at least one operating state, at low rotational speeds of the internal combustion engine or the output shaft, in particular at rotational speeds of less than 500 or 600 revolutions per minute, for example, sufficient decompression can be ensured in the combustion chamber, which is designed as a cylinder, for example. This means in particular that an excessive or undesirable compression of the air introduced into the combustion chamber can be avoided. However, at higher rotational speeds, in particular at speeds exceeding 500 or 600 revolutions per minute, a sufficient compression of at least the air, in particular of a mixture received in the combustion chamber and comprising the air and in particular liquid fuel, may be ensured such that the mixture can be ignited, for example, and can subsequently be combusted. In other words, in the case of the internal combustion engine according to the invention, an excessive compression in the combustion chamber can be avoided by means of the same intermediate position at low rotational speeds, and at which, compared to higher rotational speeds, there is sufficient compression in the combustion chamber such that a particularly advantageous operation of the internal combustion engine can be implemented.

It has been shown here to be particularly advantageous if the part, during which the gas exchange valve is held in the intermediate position, and thus the first valve lift curve has the plateau, comprises more than half of the compression cycle and less than the entire compression cycle. In other words, this part is preferably more than 50 percent and less than 100 percent of the compression cycle. On the one hand, this makes it possible to avoid an excessive compression at low rotational speeds and, on the other hand, to ensure a sufficient compression in the combustion chamber at higher rotational speeds while the gas exchange valve is in the same intermediate position.

A further embodiment is characterized by the fact that the gas exchange valve is designed as an inlet valve, via which the combustion chamber can at least be supplied with air. In this way, the compression cycle following the open position can be implemented in a particularly advantageous way, such that an excessive compression can be avoided at low rotational speeds and a sufficient compression can be implemented in the combustion chamber at rotational speeds that are sufficient in comparison.

In a further embodiment of the invention, the gas exchange valve has a first stroke in the open position and a second stroke in the intermediate position which is smaller compared to the first stroke and which is constant during the part of the compression cycle following the open position of the valve. Advantageously, the stroke of the gas exchange valve does not change during the intermediate position, such that a flat plateau can be represented, whereby a simple cam shape can be selected.

In an alternative embodiment of the invention, the gas exchange valve has a first stroke in the open position and a second stroke in the intermediate position which is smaller compared to the first stroke, and which has at least partially a varying stroke during the part of the compression cycle. The plateau can have a flat portion and rising and/or falling portions. It is also conceivable that the plateau rises or falls as a whole. Plateaus which have varying heights and are arranged in a row are also conceivable. Ultimately, all forms of a plateau in the intermediate position which appear sensible to a person skilled in the art are conceivable.

In a particularly advantageous embodiment of the invention, the gas exchange valve has a first stroke in the open position and a second stroke, which is smaller compared to the first stroke, in the intermediate position. Furthermore, it is conceivable that the gas exchange valve has a third stroke in the first and second closed position, which is 0, in particular 0 millimeters, for example. In other words, the gas exchange valve is, for example, closed in the first and second closed position, whereby the gas exchange valve in the closed position closes, i.e., fluidically blocks, an assigned gas channel which is designed, for example, as an inlet channel and, in particular, through which air can flow.

In order to move the gas exchange valve from the second closed position to the open position or in the direction of the open position, the gas exchange valve is opened. When it moves from the second closed position to the open position, the gas exchange valve carries out the already mentioned first stroke. The first stroke is thus a first path or a first stretch by which the gas exchange valve is or was moved from the second closed position in order to move the gas exchange valve from the closed position to the open position. In other words, the first stroke is a first path or a first stretch by which the gas exchange valve in the open position is moved in relation to the second closed position. Consequently, the second stroke is a second path or a second distance by which the gas exchange valve in the intermediate position is moved relative to the closed position. In this way, the gas exchange valve in the intermediate position is closed further than in the open position, but opened further than in the closed position. If, for example, the gas exchange valve is first moved from the closed position to the open position, the gas exchange valve carries out the first stroke and the gas exchange valve is moved translationally in a first direction. If the gas exchange valve is moved from the open position in the direction of the closed position and thereby into the intermediate position, the gas exchange valve is moved in a second direction opposite to the first direction and thereby translationally by a fourth stroke. The third stroke is thus the difference between the first stroke and the fourth stroke. In order to move the gas exchange valve from the intermediate position to the closed position, the gas exchange valve is moved in the second direction and carries out the second stroke, but in the second direction.

It has proved to be particularly advantageous if the second stroke is in a range of 5% to 20% inclusive, in particular in a range of 8% to 19% inclusive and preferably in a range of 9% to 18% inclusive, of the first stroke. In this way, an excessive compaction or compression can be avoided at low rotational speeds, such that a particularly advantageous decompression can be implemented at low rotational speeds. However, at rotational speeds which are higher in comparison, a sufficient compression or compaction can be ensured such that, for example, the internal combustion engine can be operated in its fired mode or brought into the fired mode in a particularly advantageous way. The different embodiments of the plateau move in these areas.

In a further embodiment, the gas exchange valve can firstly be moved from the open position to the first closed position and then the gas exchange valve can be moved from the first closed position to the intermediate position. Here, the gas exchange valve closes for a short period of time before it opens again and reaches its intermediate position.

A further embodiment is characterized by the fact that the gas exchange valve has a stroke in the intermediate position which lies in a range of from 0.2 millimeters to 2 millimeters inclusive, in particular in a range of from 0.5 millimeters to 1 millimeter inclusive. In other words, the second stroke is preferably in a range of from 0.2 millimeters to 2 millimeters inclusive, in particular in a range of from 0.5 millimeters to 1 millimeter inclusive.

In a further embodiment of the invention, a piston is received in the combustion chamber between a top dead center and a bottom dead center in a translationally moveable manner. In other words, the internal combustion engine preferably comprises a piston assigned to the combustion chamber, which is received in the combustion chamber, preferably in the form of a cylinder, in a translationally moveable manner and is thereby translationally moveable between a top dead center and a bottom dead center. During the compression cycle, the piston moves from its bottom dead center to its top dead center.

The compression cycle referred to within the scope of the invention is a cycle of the combustion chamber or the internal combustion engine, wherein this cycle is referred to as "compression cycle" to describe, for example, that the piston moves from its bottom dead center to its top dead center or that the compression cycle is used, for example, in at least one further operating state different from the at least one operating state, in order to compress the air received in the combustion chamber or the mixture received in the combustion chamber as described above, in particular to compress it more strongly than in the at least one operating state at the higher rotational speeds described above. In this further operating state, the gas exchange valve is operated or moved, for example, according to a second valve lift curve different from the first valve lift curve. By way of example, the second valve lift curve does not have the plateau or the second valve lift curve has no plateau, for example. By moving the gas exchange valve according to the second valve lift curve, a stronger compression of the air or mixture is caused in the case of the compression cycle or during the compression cycle than in the at least one operating state, in particular at the higher rotational speeds mentioned above. In particular, it is provided, for example, that the gas exchange valve reaches the closed position earlier or is moved to the closed position earlier according to the second valve lift curve than according to the first valve lift curve. Again in other words, it is provided, for example, that the gas exchange valve reaches its closed position, in particular directly or immediately following the open position, earlier than in the at least one operating state.

Furthermore, the internal combustion engine is preferably designed as a four-cycle engine, the operating cycle thereof comprising, in particular exactly, four cycles. Of these four cycles, the aforementioned compression cycle is one cycle. The operating cycle comprises, for example, exactly two complete revolutions of the output shaft and thus, for example, 720 degrees of crank angle. Within the scope of the operating cycle, for example, a first of the cycles is an intake cycle, also referred to as intake stroke, in which the piston moves from the top dead center to the bottom dead center and at least the aforementioned air, for example, is sucked into the combustion chamber. A second of the cycles, in particular following the intake cycle directly or immediately, is the aforementioned compression cycle, in which the piston moves from the bottom dead center to the top dead center. In the further operating state and in the at least one operating state at higher rotational speeds, a compression of the air or the mixture caused by the piston occurs, wherein, however, in the at least one operating state at lower rotational speeds, an excessive compaction or compression can be avoided. A third of the cycles immediately or directly following the second cycle is, for example, a working cycle in which, for example, the mixture, which is in particular compressed, is ignited and combusted. The piston is thus driven and moved into the bottom dead center, such that the piston moves from the top dead center to the bottom dead center in the third cycle. The combustion of the mixture also results in exhaust gas. The fourth cycle, which follows the third cycle, is an exhaust cycle in which the piston moves from the bottom dead center to the top dead center and thereby pushes out the exhaust gas initially received in the combustion chamber from the combustion chamber.

In order to implement a particularly advantageous operation, it has proved to be favorable if the gas exchange valve leaves its intermediate position in the direction of the closed position before the piston reaches the top dead center during the compression cycle. In this way, a sufficient compression in the combustion chamber, in particular at higher rotational speeds, can be ensured, such that the mixture can be sufficiently compressed and subsequently ignited and combusted.

In order to be able to ensure a sufficient compression in the combustion chamber in the at least one operating state at the higher rotational speeds, it is provided in a further embodiment of the invention that the gas exchange valve reaches its closed position before the piston reached the top dead center during the compression cycle.

In order to further develop a method of the kind specified herein in such a way that a particularly advantageous operation of the internal combustion engine can be implemented, it is provided in accordance with the invention that, in at least one operating state of the internal combustion engine, the gas exchange valve is moved on its path from the open position in the direction of the first closed position into an intermediate position between the open position and the first closed position, and is held in the intermediate position at least during part of a compression cycle of the combustion chamber following the open position of the gas exchange valve, in particular directly or immediately. Advantages and advantageous designs of the method according to the invention are to be regarded as advantages and advantageous designs of the internal combustion engine according to the invention and vice versa.

It has proved to be particularly advantageous if the internal combustion engine is started in the at least one operating state. In other words, it is preferably provided that the internal combustion engine is started while the at least one operating state is set, i.e., while the internal combustion engine is in the at least one operating state. In this way, it is possible, for example, to drive or to drag the output shaft when the internal combustion engine is started, whereby the output shaft is brought to a rotational speed different from 0 and greater than 0, for example, in particular from its standstill. In particular, the internal combustion engine is started by effecting a predeterminable rotational speed of the output shaft, also known as the target rotational speed, in particular by means of a starter or a starter generator. However, before the output shaft reaches the desired target rotational speed, the internal combustion engine has or passes through substantially lower rotational speeds compared to the target rotational speed, since the output shaft is brought or accelerated to the target rotational speed, for example, starting from its standstill and thus from the rotational speed 0. It is provided, for example, that the output shaft is driven by means of the starter or by means of a drive device different from the internal combustion engine, such as an electric motor, at least until the output shaft is driven by means of combustion processes taking place in the combustion chamber. In the course of these combustion processes, respective mixtures are compressed and ignited or combusted in the combustion chamber in the manner described above.

By setting the at least one operating state, it is now possible to avoid an excessive compression, which opposes the driving of the output shaft, in the combustion chamber at the lower rotational speeds already mentioned, such that the output shaft can be accelerated particularly quickly or brought to the target rotational speed. At the higher rotational speeds already mentioned, however, a sufficient compression in the combustion chamber can be ensured, such that combustion processes take place in the combustion chamber, in particular at a particularly early stage, and can subsequently drive the output shaft. In this way, the internal combustion engine can be started particularly quickly and particularly efficiently, i.e., in a particularly short time, i.e., to be transferred from their unfired operation to their fired operation. During unfired operation, no combustion processes take place in the combustion chamber, wherein during fired operation, however, combustion processes take place in the combustion chamber and drive the output shaft. A torque required to start the internal combustion engine and thus to drive and thus to drive or accelerate the output shaft is also referred to as the starting torque, which can be kept particularly low in the internal combustion engine according to the invention or by means of the method according to the invention.

The internal combustion engine according to the invention and the method according to the invention are particularly advantageous for use in a motor vehicle designed as a hybrid vehicle, since by means of the internal combustion engine according to the invention or by means or the method according to the invention, a particularly advantageous transition from purely electric driving to driving with an internal combustion engine can be created, in which the motor vehicle is driven, for example, exclusively by means of the internal combustion engine or at least with the assistance of the internal combustion engine.

The invention is based in particular on the following finding: in the case of a hybrid vehicle designed as a plug-in hybrid vehicle, for example, it is desirable that the change from purely electric driving to driving by means of the internal combustion engine, also referred to as the combustion engine, takes place as quickly and as smoothly as possible. For this purpose, it is desirable to start the internal combustion engine in a very short period of time with as little torque expense as possible and to fulfil corresponding load and rotational speed requirements. The starting torque of the internal combustion engine should be as low as possible, for example, in order to place only a low load on at least one clutch and on an electric machine designed to drive the hybrid vehicle. During electric driving, for example, the vehicle is driven exclusively by means of the electric machine. A particularly advantageous starting of the internal combustion engine can be achieved if the internal combustion engine itself supports the starting process by initiating the combustion processes, i.e., the combustion in the combustion chamber, and thus a start-up which takes place during the starting process. During this start-up, for example, the output shaft is brought to the target speed, as described above.

In order to reduce or keep the starting torque of the internal combustion engine low, compression losses in the combustion chamber can, for example, be at least kept low or minimized by, for example, keeping the gas exchange valve, in particular the inlet valve, open, in particular fully open, during the compression cycle and thus remaining in the open position, thereby preventing a compression in the combustion chamber. This is also referred to as decompression. However, by preventing compression in the combustion chamber, the air or mixture in the combustion chamber is not compressed, such that a combustion of the mixture is not possible. As a result, a combustion in the combustion chamber that supports the starting or the start of the internal combustion engine cannot be implemented.

However, moving or operating the gas exchange valve according to the second valve lift curve during the engine start-up is disadvantageous, since this would lead to an excessively high starting torque and thus to a high load on the electrical machine and the clutch. The aforementioned acceleration or bringing the output shaft to the target rotational speed is also referred to as towing. In order to be able to keep compression losses at least particularly low during the towing, but to enable one combustion supporting the starting of the internal combustion engine or several combustions in the combustion chamber supporting the starting of the internal combustion engine at increasing rotational speed, the first valve lift curve described above is used, which leads to a special valve lift of the gas exchange valve. The first valve lift curve represents a compromise between avoiding an excessive compression in the combustion chamber and causing a sufficient compression in the combustion chamber. The valve lift curve, for example, has a conventional lift shape with a small residual stroke in the region of the bottom dead center and a subsequent constant stroke which causes the intermediate position or holding in the intermediate position and which is, for example, in a range of from 0.2 millimeters up to and including 2 millimeters, in particular in a range of from 0.5 millimeters up to and including 1 millimeter. The constant stroke is preferably carried out close to the top dead center of the compression cycle.

At low rotational speeds or flow speeds at the gas exchange valve, the first valve lift curve prevents an excessive compression in the combustion chamber, which means that the starting torque, also referred to as drag torque, can be kept particularly low when starting the internal combustion engine. However, with an increasing rotational speed of the output shaft, the flow velocity and thus a flow resistance increase in a narrow gap between, for example, a valve disc of the gas exchange valve and a corresponding valve seat on which the gas exchange valve, in particular the valve disc, sits in the closed position. In this way, for example, a mass flowing out of the combustion chamber via the gas exchange valve located in the intermediate position can be kept particularly low, such that despite the fact that the gas exchange valve is in the intermediate position and is therefore slightly open, a compression effect or compaction effect is produced in the combustion chamber, as a result of which the mixture is sufficiently compacted and can subsequently be combusted. For the charge exchange, the effect of the plateau, also referred to as the residual stroke plateau, is only subordinate, and the filling of the combustion chamber is more strongly maintained with increasing rotational speed, which results in an increasing torque of the internal combustion engine. The acceleration of the internal combustion engine or the output shaft increases without any additional load on the clutch or the electric machine.

The first valve lift curve and thus the plateau can be implemented under a corresponding cam shape of a cam, by means of which the gas exchange valve can be actuated and thus moved from the closed position to the open position or to the intermediate position. By means of this cam shape, an emergency operation on the cam also referred to as the decompression cam can be enabled. The internal combustion engine can thus drive a low torque and is still executable, for example, in the event of a malfunction of a variable valve train designed to vary the stroke of the gas exchange valve, for example, which is not possible with a classic or conventional decompression cam that completely prevents the compression in the combustion chamber.

In the case of increasing load demands on the internal combustion engine, there is, for example, a switchover from the first valve lift curve to the in particular conventional second valve lift curve, in particular by means of a valve stroke switchover and thus for example by means of a variable valve drive which is designed, for example, to vary the stroke of the gas exchange valve.

By way of example, in order not to control the effect of the flow speeds at corresponding rotational speeds exclusively via the stroke in the region of the plateau, a so-called intake valve phase can be used. In this case, for example, at least two intake valves are assigned to the combustion chamber, wherein the described intermediate position or plateau and thus the method according to the invention is only applied to one of the intake valves, whereas the second intake valve, for example, is moved or operated in a different manner from the one intake valve. The second inlet valve, for example, can be moved or operated conventionally or according to the second valve lift curve, or it can be switched off such that the second inlet valve does not carry out a stroke, for example. In other words, the second intake valve can be varied from a conventional full-stroke-cam to a switching off of the second intake valve for the design.

Further advantages, features and details of the invention arise from the following description of a preferred exemplary embodiment and by means of the drawings. The features and combinations of features mentioned in the description above as well as the features and combinations of features mentioned in the following figure description and/or the features and combinations of features shown in the figures alone can be used not only in the combination specified in each case, but also in other combinations or on their own, without leaving the scope of the invention.

DETAILED DESCRIPTION OF THE DRAWINGS

Figure 1:
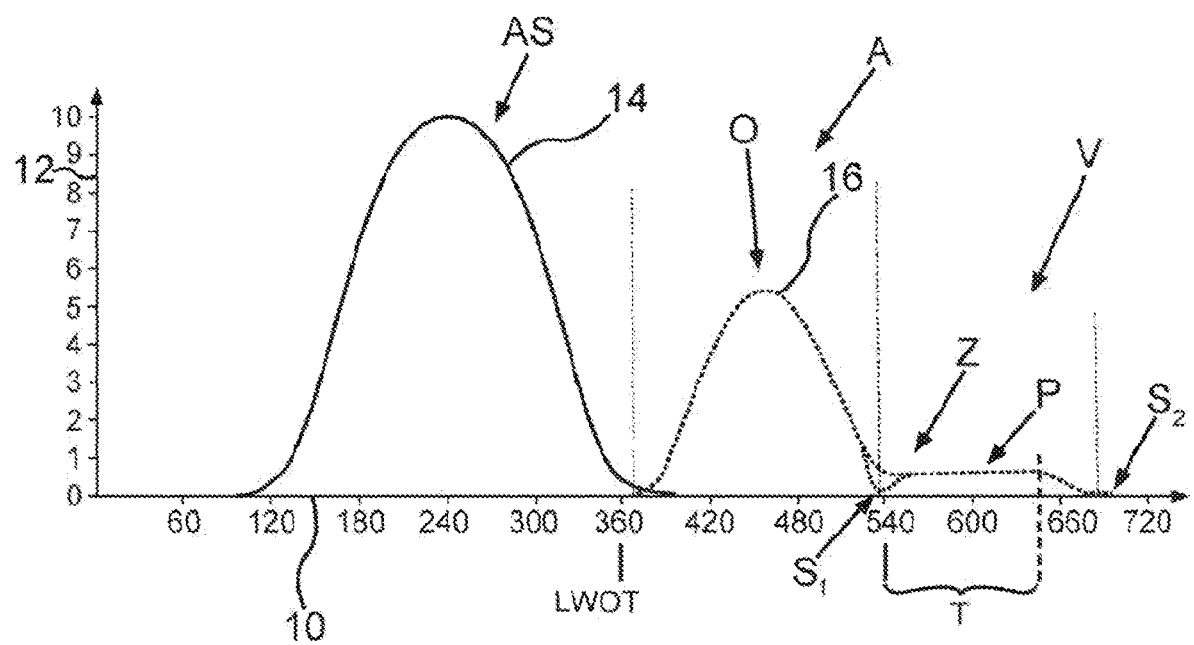
FIG. 1 is a diagram with valve lift curves to illustrate an internal combustion engine according to the invention and a method according to the invention.

In the Figures, identical or functionally identical elements are provided with identical reference numerals.

FIG. 1 shows a diagram, by means of which an internal combustion engine for a motor vehicle and a method for operating such an internal combustion engine are explained below. The motor vehicle is, for example, an automobile, in particular, a passenger car. In particular, the motor vehicle can be designed as a hybrid vehicle and comprise the internal combustion engine and at least one electric machine, also referred to as a traction machine, wherein the motor vehicle can be driven by means of the internal combustion engine and by means of the electric machine. In particular, a purely electric driving is possible, for example, during which the motor vehicle is driven exclusively by means of the electric machine, but not by the internal combustion engine. Furthermore, driving with an internal combustion engine is also conceivable, for example, in which the motor vehicle is driven exclusively by means of the internal combustion engine, but not by means of the electric machine or alternatively by means of the internal combustion engine and the electric machine. This means, for example, that the internal combustion engine is deactivated during electric driving and is therefore in an unfired operation.

During the method with the internal combustion engine, however, the internal combustion engine is activated and therefore in fired operation. The internal combustion has at least one or more combustion chambers, for example, designed as cylinders, in which combustion processes take place during the fired operation. Within the course of such a combustion process, a respective mixture received in the combustion chamber is ignited and combusted, wherein the mixture comprises air introduced into the combustion chamber and fuel introduced into the combustion chamber. The fuel is preferably a liquid fuel and is used to implement the fired operation. Obviously, gaseous fuels are also conceivable. In order to activate the initially deactivated internal combustion engine, i.e., to transfer from the unfired operation to the fired operation, the internal combustion engine is started. The internal combustion engine has an output shaft designed in particular as a crankshaft, which can rotate, for example, about an axis of rotation relative to a motor housing of the internal combustion engine. Exactly one working cycle of the internal combustion engine comprises exactly two complete rotations of the output shaft, the rotational positions of which are also referred to as the crank angle degree. Thus exactly one working cycle comprises exactly 720 degrees of crank angle of the output shaft.

Furthermore, exactly one working cycle comprises exactly four cycles, for example. A first of the cycles is, for example, an intake cycle, which is also referred to as an intake stroke. In the combustion chamber, which is designed as a cylinder, for example, a piston is accommodated so that it can move translationally, and which can be moved between a bottom dead center and a top dead center. In the intake cycle, the piston moves from its top dead center to its bottom dead center and, in doing so, draws in at least the aforementioned air, for example, into the combustion chamber. A second of the cycles following the first cycle is a compaction cycle, also known as a compression stroke or compression cycle, in which the cylinder moves from its bottom dead center to its top dead center. The top dead center, in which the piston moves during the compression cycle, for example, is also referred to as the top ignition dead center (TDC), since the mixture in the combustion chamber is ignited in this region, in particular during fired operation. A third cycle following the second cycle is a working cycle in which the piston moves from its top dead center (top ignition dead center) to the bottom dead center. The fourth cycle following the third cycle is an exhaust cycle, in which the piston moves from the bottom dead center to the top dead center, which depicts a so-called top charge exchange dead center (LWOT). The combustion of the mixture results in exhaust gas which is expelled from the combustion chamber by the piston during the exhaust cycle.

By way of example, at least two first gas exchange valves in the form of inlet valves are assigned to the combustion chamber, through which the air can flow into the combustion chamber. Furthermore, two second gas exchange valves in the form of outlet valves are assigned to the combustion chamber, through which the exhaust gas can be pushed out of the combustion chamber, for example. The method is described below, for example, by means of one of the outlet valves and by means of one of the inlet valves, wherein the previous and following statements regarding the one inlet valve or the one outlet valve can also be readily transferred to the other outlet valve or the other inlet valve and vice versa.

The rotational positions and thus the degrees of crank angle of the output shaft are plotted on the abscissa 10 of the diagram shown in FIG. 1, while a valve stroke of the respective intake valve or outlet valve is plotted on the ordinate 12. The respective gas exchange valve can be moved, in particular translationally, between a closed position and an open position and thus carries out a stroke, also referred to as a valve stroke, in millimeters, which is plotted on the ordinate 12.

In the diagram shown in FIG. 1, a valve lift curve 14 is plotted, which describes the movement of the outlet valve from the closed position to the open position and back again to the closed position of the outlet valve. Thus the outlet valve is moved or operated according to the valve lift curve 14.

During the method of the internal combustion engine, for example, the intake valve is moved from its open position in the direction of its closed position.

In the course of the method, the internal combustion engine is operated in at least one operating state. In other words, at least one operating state of the internal combustion engine is set in the course of the method, wherein the intake valve is operated or moved in the at least one operating state in accordance with a first valve lift curve 16 entered in the diagram shown in FIG. 1. The valve lift curve 16 describes or illustrates the movement of the intake valve from the closed position into the open position and back into the closed position again.

In order to be able to implement a particularly advantageous operation of the internal combustion engine, in particular to start the internal combustion engine in a particularly advantageous way and thus to implement a particularly advantageous transition from electric driving to driving with an internal combustion engine, in the at least one operating state of the internal combustion engine, the intake valve is moved on its way from the open position of the intake valve designated as O in FIG. 1 in the direction of the first closed position of the intake valve designated as $S_1$ in FIG. 1 to an intermediate position Z located or arranged between the open position O and the closed position $S_1$, and held in the intermediate position Z during at least a part T of the compression stroke designated as V in FIG. 1, immediately or directly following the open position O and immediately or directly following the intake cycle designated as A in FIG. 1. The inlet valve does not reach the first closed position $S_1$, but rather passes over from the open position O to the intermediate position Z. As a result, the valve lift curve 16 has a plateau P, wherein the plateau P and thus the intermediate position Z extend from a first of the rotational positions of the output shaft to a second of the rotational positions of the output shaft. Thus the part T extends from the first rotational position to the second rotational position. Several further rotational positions of the output shaft are located between the first rotational position and the second rotational position. From or after the second rotational position, the inlet valve leaves the intermediate position Z in the direction of the second closed position $S_2$, such that the plateau P drops from or after the second rotational position. The plateau P and thus the intermediate position Z are at least substantially constant during the part T. Since the intermediate position Z lies between the open position O and the second closed position $S_2$, the inlet valve is closed further in the intermediate position Z in relation to the open position O, but is further opened in relation to the first closed position $S_1$ and the second closed position $S_2$, such that there is, for example, a small gap between the inlet valve, in particular its valve plate, and a corresponding valve seat. This makes it possible, for example, to avoid an excessive compression or compaction in the combustion chamber at low rotational speeds of less than 500 revolutions per minute or when the rotational speed falls below a limit, such that only a low starting torque prevents the internal combustion engine starting. However, as the rotational speed increases, a sufficient compression in the combustion chamber can be effected such that, for example, at high rotational speeds of more than 500 revolutions per minute or when the rotational speed exceeds or reaches the limit, a sufficient compression in the combustion chamber occurs. In this way, for example, the mixture received in the combustion chamber can be sufficiently compacted and subsequently ignited and combusted, such that the starting of the internal combustion engine and an accompanying acceleration or dragging up of the output shaft can be supported by combustion processes in the combustion chamber. The limit value can, for example, be 500 or 600 revolutions per minute or can have a different value.

In a further embodiment, the inlet valve can initially assume the first closed position $S_1$ on its way from its open position O to the intermediate position Z. From the first closed position $S_1$, the inlet valve opens again and occupies its intermediate position Z.

By means of the valve lift curve 16 and the ordinate 12 from FIG. 1, it can be particularly easily recognized that the inlet valve has a first stroke in the open position O and a second stroke in the intermediate position Z which is smaller than the first stroke and which is, for example, in a range of from 5 percent to 20 percent inclusive of the first stroke. In particular, the second stroke, for example, is in the range of 0.2 millimeters up to and including 2 millimeters inclusive, in particular in a range of 0.5 millimeters up to and including 1 millimeter inclusive. Furthermore, the exhaust cycle in FIG. 1 is designated as AS, such that the top charge exchange dead center LWOT shown in FIG. 1 on the left, in relation to the image plane in FIG. 1, is the aforementioned top charge exchange dead center.

In addition to the level course with a constant stroke shown in FIG. 1, the plateau P can show a non-constant course in a further embodiment which is not shown. Here, the gas exchange valve has a first stroke in the open position O and a second stroke in the intermediate position Z, which is smaller than the first stroke, and at least partially has a varying stroke during the part T of the compression cycle V. The plateau P can have a level portion and rising and/or falling portions. It is also conceivable that the plateau P rises or falls overall. Plateaus which vary in height and are arranged in a row are also conceivable.

Figure 2:
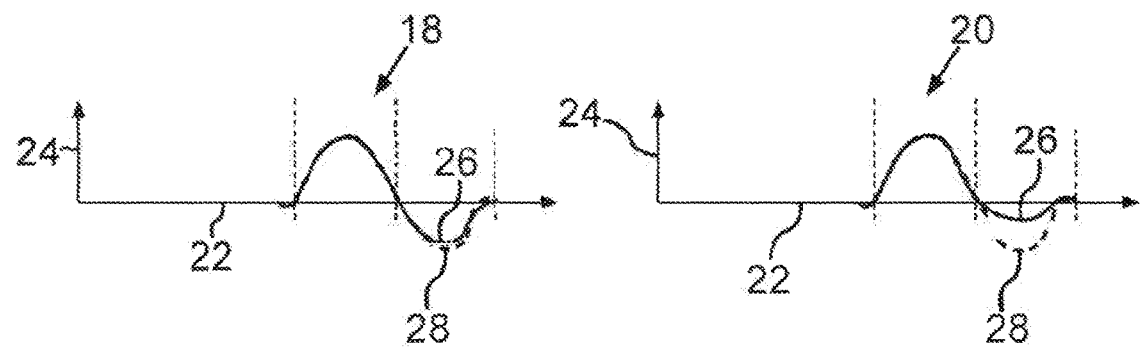
FIG. 2 is further diagrams to illustrate the internal combustion engine and the method.

FIG. 2 shows diagrams 18 and 20, on whose abscissa 22 degrees of crank angle are plotted. On the respective ordinate 24, a respective mass flow is plotted, which flows into and out of the combustion chamber. A respective course 26 or 28 thus illustrates the mass flow into and out of the combustion chamber during the working cycle, wherein the course 26 illustrates the mass flow caused by the valve lift curve 16. The course 28 illustrates the mass flow with a valve lift curve of a conventional decompression cam. Positive values or ranges of the respective course 26 or 28 illustrate the mass flow flowing into the cylinder, while negative ranges or values of the respective course 26 or 28 illustrate the mass flow flowing out of the combustion chamber.

Diagram 18 shows that, for example, decompression is set into the combustion chamber at low rotational speeds of less than 500 revolutions per minute, wherein only low flow velocities occur in the region of the upper ignition dead center. The courses 26 and 28 in diagram 20 illustrate the respective mass flows at higher rotational speeds of, for example, more than 500 revolutions per minute. As can be seen from the course 26 compared to the course 28, a mass flow from the combustion chamber is significantly reduced due to the valve lift curve 16, such that a sufficient compression or compaction of the mixture can be effected, allowing the mixture to be ignited and combusted in the combustion chamber.

Figure 3:
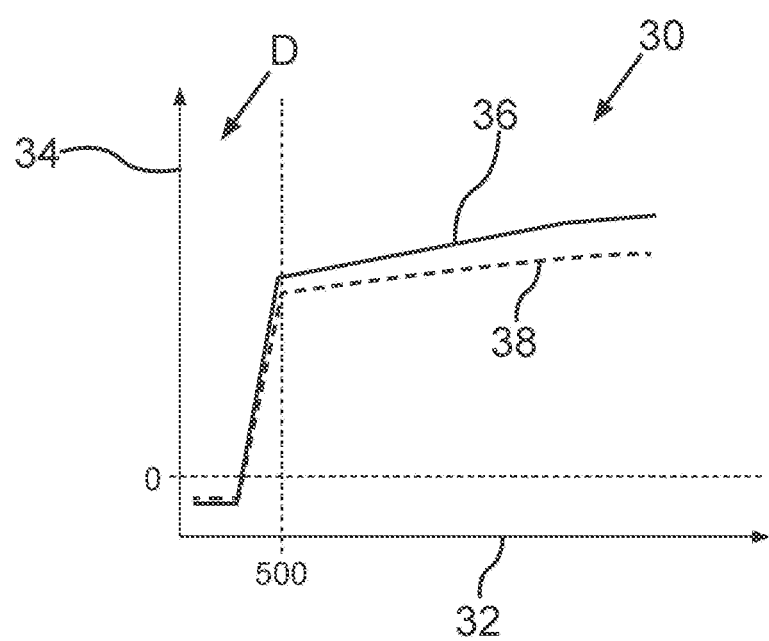
FIG. 3 is a further diagram to illustrate the internal combustion engine according to the invention and the method according to the invention.

FIG. 3 shows a diagram 30 on whose abscissa 32 the rotational speed of the output shaft is plotted. The load or the torque is plotted on the ordinate 34, the load or torque being provided by the internal combustion engine via the output shaft, for example. A course 36 recorded in the diagram shown in FIG. 3 illustrates the torque against the rotational speed when the intake valve is moved or operated according to the valve lift curve 16, while a course 38 shows the torque against the rotational speed with a conventional valve lift curve or conventional decompression cams. It can also be seen from FIG. 3 that, at rotational speeds of less than 500 revolutions per minute, a decompression, designated D in FIG. 3, can be effected in the combustion chamber, such that starting the combustion engine at low rotational speeds is countered by only a low torque, such that the internal combustion engine can be started particularly quickly. At higher rotational speeds, however, the valve lift curve 16 can be used to achieve a sufficient compression in the combustion chamber, such that minimal combustions can be implemented in the combustion chamber at rotational speeds above 500 revolutions per minute, for example. Due to these minimal combustions, the starting of the internal combustion engine or the acceleration or dragging up of the output shaft can be supported, whereby the internal combustion engine can be started particularly quickly. This ensures an almost imperceptible transition from electric driving to driving with an internal combustion engine. The valve lift curve 16 is thus a valve lift with the plateau P in the region of the intake closing, in order to be able to ensure a sufficient decompression and a rotational speed-dependent filling composition in the combustion chamber.

The invention claimed is:

1. An internal combustion engine for a motor vehicle, comprising;
a combustion chamber fillable with air and fuel for operating the internal combustion engine; and
a gas exchange valve which is assigned to the combustion chamber and which is movable between an open position and a first closed position;
wherein in an operating state of a starting of the internal combustion engine, the gas exchange valve is movable on a path from the open position in a direction of the first closed position into an intermediate position located between the open position and the first closed position and is holdable in the intermediate position at least during a part of a compression cycle of the combustion chamber following the open position of the gas exchange valve and is movable into a second closed position following the intermediate position;
wherein the part comprises more than a half of the compression cycle and less than a whole of the compression cycle; and
wherein the gas exchange valve is an inlet valve via which the combustion chamber is supplyable at least with the air.

2. The internal combustion engine according to claim 1, wherein the gas exchange valve has a first stroke in the open position and a second stroke in the intermediate position which is smaller than the first stroke and which is constant during the part.

3. The internal combustion engine according to claim 2, wherein the second stroke is in a range of 5% to 20% inclusive of the first stroke.

4. The internal combustion engine according to claim 1, wherein the gas exchange valve has a first stroke in the open position and a second stroke in the intermediate position which is smaller than the first stroke and which at least temporarily has a varying stroke during the part.

5. The internal combustion engine according to claim 1, wherein the gas exchange valve is firstly movable from the open position to the first closed position and then is subsequently movable from the first closed position to the intermediate position.

6. The internal combustion engine according to claim 1, wherein the gas exchange valve has a first stroke in the open position and a second stroke in the intermediate position which is within a range of 0.2 millimeters to 2 millimeters inclusive.

7. The internal combustion engine according to claim 1 further comprising a piston which is accommodated in the combustion chamber so as to be translationally moveable between a top dead center and a bottom dead center, wherein the piston moves from the bottom dead center to the top dead center during the compression cycle.

8. The internal combustion engine according to claim 7, wherein the gas exchange valve leaves the intermediate position in a direction of the second closed position before the piston reaches the top dead center during the compression cycle.

9. The internal combustion engine according to claim 7, wherein the gas exchange valve reaches the second closed position before the piston reaches the top dead center during the compression cycle.

* * * * *